April 29, 1930.　　　K. E. PEILER　　　1,756,493

FEEDING MOLTEN GLASS

Original Filed March 17, 1914　　4 Sheets-Sheet 1

Witnesses:

Inventor:
Karl E. Peiler
by W. H. Honiss
Atty.

April 29, 1930.  K. E. PEILER  1,756,493
FEEDING MOLTEN GLASS
Original Filed March 17, 1914   4 Sheets-Sheet 2

Witnesses:

Inventor:
Karl E. Peiler
by Wm H Honiss
Atty.

April 29, 1930.   K. E. PEILER   1,756,493
FEEDING MOLTEN GLASS
Original Filed March 17, 1914   4 Sheets-Sheet 3

Witnesses:

Inventor:
Karl E. Peiler
by
Atty.

April 29, 1930.  K. E. PEILER  1,756,493
FEEDING MOLTEN GLASS
Original Filed March 17, 1914   4 Sheets-Sheet 4

Witnesses:

Inventor:
Karl E. Peiler
by W. H. Honiss
Att'y.

Patented Apr. 29, 1930

1,756,493

UNITED STATES PATENT OFFICE

KARL E. PEILER, OF WEST HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE

FEEDING MOLTEN GLASS

Application filed March 17, 1914, Serial No. 343,813. Renewed December 10, 1919.

This invention comprises an improved method of and apparatus for feeding molten glass in elongated and more or less attenuated blanks, suitable for parison blanks and similar purposes.

The invention may be adapted to various uses, from hand operations employing a single die, to apparatus operated mechanically and more or less automatically, and employing a plurality of dies. Some of these adaptations are illustrated in the accompanying drawings.

On account of the unstable character of molten glass, whereby it tends to droop and slump into diverse squat shapes while being flowed, severed and conveyed from a melting tank to a shaping machine, it is difficult to feed it uniformly and rapidly in separated charges or gathers of any definite shape or size, and particularly in extended and attenuated form suitable for parison blanks for bottles and other longitudinally extended articles. Even in the case of pressing molds, it is desirable, although for the reasons above given, it is found difficult, to feed the charges of glass uniformly, centrally, and cleanly into the mouths of the pressing molds. A principal object of the present invention is to overcome these difficulties, and to impart to the charges of glass an elongated and attenuated form as they are fed to their shaping molds, without appreciably chilling or delaying them in transit.

Figure 1 of the drawings is a plan view, and Fig. 2 an elevation in section taken on the line 2—2 of Fig. 1, showing the details of the drawing die illustrated in the succeeding views and on a scale larger than the scale of those views. Fig. 5 is a plan view, and Fig. 6 an elevation shown partly in section taken on the line 6—6 of Fig. 5, showing the application of my invention to another type of shaping machine. Fig. 7 is a plan view.

The method or course of treatment contemplated in this invention involves the shaping of the more or less shapeless and irregular charges of molten glass, as or after they are severed from the gather, or flowed from a spout or orifice in any of the various well-known ways. This method consists in passing the charges of glass downwardly through a shaping die, the inner wall of which is of approximately hour-glass contour, as to its vertical lines, lubricated with a film of fluid or liquid, which enables and aids the glass to slip easily down the converging side walls to the contracted portion, through which it is extruded by the weight of the glass. The weight of the extending column of extruded glass hanging below the orifice helps to attenuate the column of glass at the orifice, by drawing the sides of the glass inwardly past the wall of the die orifice. The outward divergence of the wall, aided by its liquid film, also assists in making a complete and continuing separation between the surface of the glass and the wall of the die.

The lubricating film, after passing the contracted orifice, is conducted away from the surface of the extruded glass by the downwardly and outwardly flaring surface of the die, while the charge of glass, retaining the attenuated form it receives from the contracted orifice, passes downwardly from the die as shown in dot-and-dash outline in Fig. 2, and falls into the shaping mold below the die.

Figures 1, 2:
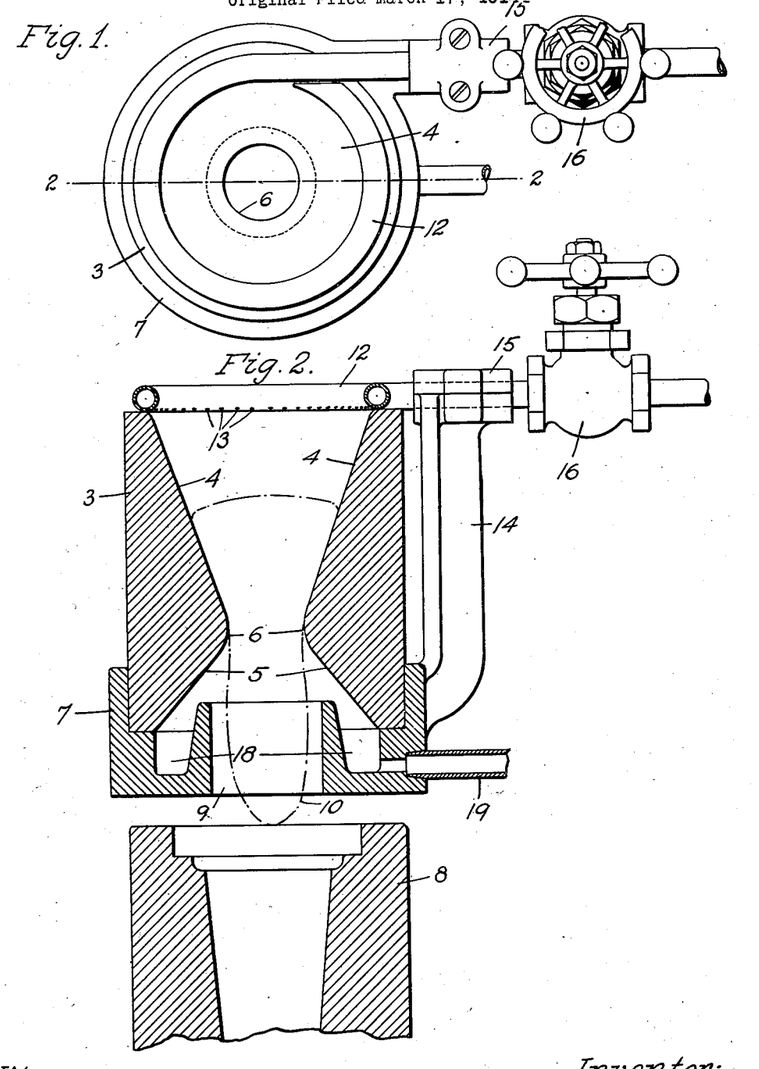

In the simple form of the apparatus shown in Figs. 1 and 2, the shaping die or funnel 3 is shown in longitudinal cross-section. The outline of the interior wall is approximately that of the conventional hour glass, the upper and lower flaring surfaces 4 and 5 of which meet in a rounded contour at the contracted or neck portion 6 of the die.

For simplicity, and for convenience in substituting different sizes or forms of dies, a holder base or carrier 7 is preferably employed, in which different sizes of dies 3 may be removably seated in alignment over the shaping mold 8, of whatever character may be employed, a central aperture 9 in the holder being provided for the blank to pass directly through to the mold. The base 7 may be supported in a fixed position by any convenient stand or bracket, and the shaping molds 8 pushed beneath it to receive the charge, or travelling carriers of various forms as shown in the succeeding figures, may be employed for receiving and carrying the shaping dies in any desired path.

As a means for applying a lubricating fluid or liquid to the die, a pipe 12, encircling the top of the die opening, is provided with a series of small holes 13 from which the liquid is directed along the flaring funnel shaped surface 4 of the upper portion of the die, either directly downward, or spirally around that surface. The supply pipe 12 is here shown to be supported by the arm 14, to which the pipe is clamped by a cap 15 or in any other convenient way, enabling the pipe to be readily put in place and removed.

Figure 3:
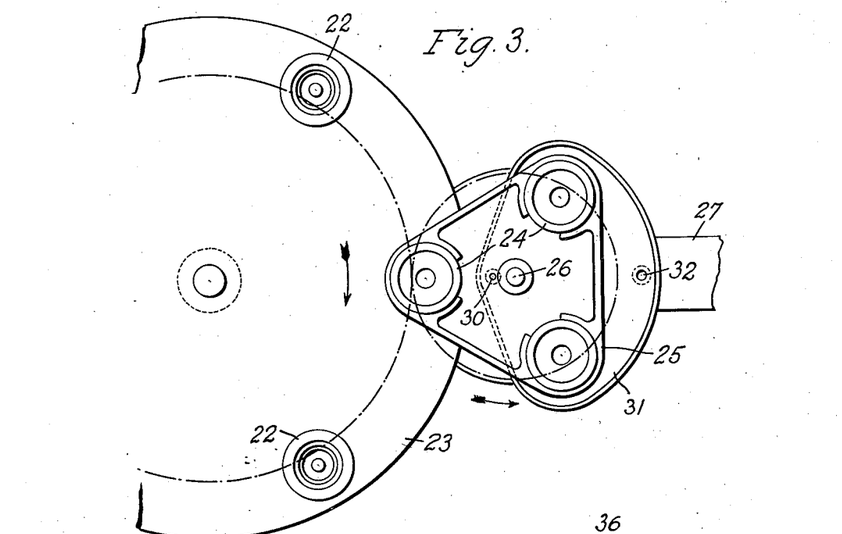
Fig. 3 is a plan view and Fig. 4 and elevation partly in section of the invention as applied to the feeding of shaping molds carried by an intermittently rotating table.
Figure 4:
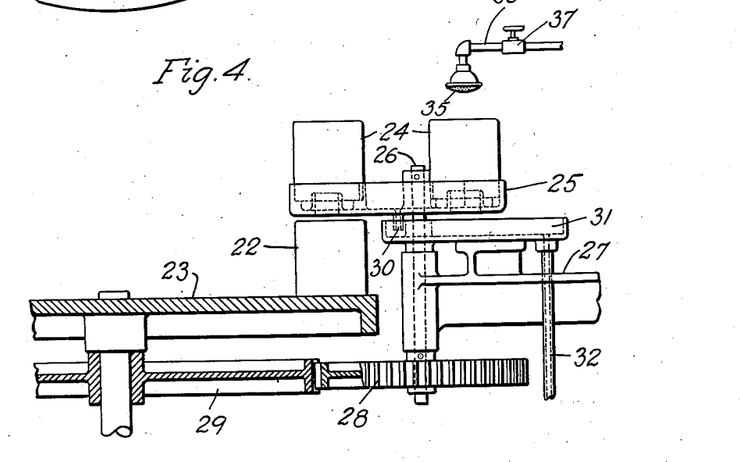

The flow of water or other lubricating liquid through the pipe 12 is regulated in any convenient way, as by the valve 16. Where intermittent flow is desired, it may be governed as to the period and volume of flow in conformity with the operations of the machine with which the apparatus is employed, by any suitable valve opened and closed by a cam in or operated by that machine, or operated by the movement of the die carrier, as illustrated in Figs. 3 and 4.

To permit an ample flow of the fluid and to avoid the necessity for accurate regulation of the amount, provision is made at the base of the die for collecting and conducting away whatever excess liquid may pass unevaporated through the die. The outwardly flaring contour of the wall below the contracted portion of the die serves to conduct the excess fluid away from the sides of the formed blank 10, so that no undesired amount of the liquid accompanies the glass into the mold 8 below. This flaring surface 5 leads the liquid to an annular trough or gutter 18 at the base of the die, preferably formed in the holder or carrier, from which the excess liquid is conducted through the drain pipe 19 to any convenient waste pipe or receptacle.

In operation, the glass, usually separated beforehand into charges or gathers of the required size, is dropped into the upper funnel-shaped receiving end of the die, and settles downwardly by its weight toward and through the contracted neck portion 6 of the die, which attenuates and elongates the charge and imparts to its the cross-sectional contour of the neck, which may be round, or any other desired contour, according to the purposes for which the blank is intended. The film of fluid or liquid covering the interior surface of the die serves to lubricate the surface so that the glass slips down readily, without adhering to the die, and also aids in keeping down the heat of the die, not only by absorbing and conducting away the heat of the metal, but also by reason of the more or less heat insulating properties of the film.

As illustrated in Figs. 1 and 2, one of these drawing dies may be used in conjunction with one or more shaping molds, manipulated by hand, as a simple use of the invention. In Figs. 3 and 4 is shown a more highly organized arrangement, in which the shaping molds 22 are carried on a rotary table 23, and a plurality of shaping dies 24 are employed for shaping and delivering the charges successively to the shaping molds. The shaping dies 24 are supported upon a revolving carrier 25, which in this instance, for holding three dies, is triangular, the dies being placed at the three corners. The carrier 25 is fixed upon the upper end of the shaft 26, which is mounted to revolve in a bracket 27 projecting from any convenient frame or support, adjacent to the glass tank or furnace, from which the molten glass is fed to the dies, either by hand gatherers or by any hand or mechanically operated feeder or gatherer, like that for example shown in Letters Patent No. 1,264,328 granted to me April 30, 1918. The stationary form of spout and delivery trough shown in Fig. 3 of that patent may be employed for feeding the gathers to the distributing dies or hoppers of the present application, while the latter are approximately stationary; or reversing their movement at the rearward end of that movement. Or the swinging forms of delivery trough shown in Figs. 5 to 9 inclusive of that patent may be employed for feeding the gathers to the distributing dies or hoppers of the present application while the latter are traveling forward with their respective molds. The lower end of the shaft 26 has fixed upon it a gear 28 meshing with a spur gear 29, which is attached to or rotates with the mold table 23, so as to revolve the shaping molds 22 and the shaping dies 24 in suitable time relation to each other. This rotative movement may be continuous or intermittent, according to the necessities or conveniences of the work, or of the particular mechanism with which these devices are employed.

The revolving carrier 25 is shown adapted to serve as a pan for collecting and conducting the surplus water or other lubricating liquid employed from the dies to the outlet 30, through which the liquid runs into the catch basin 31, which is here shown to be also supported upon the bracket 27, and is provided with a waste pipe 32, through which the waste liquid flows away.

In this embodiment of the invention the dies are supplied with water or other suitable liquid from a spray nozzle 35 fed by a pipe 36 through which the liquid flows, regulated to the desired extent by any suitable valve 37. The position of this spray nozzle being over the catch basin 31, the latter catches whatever liquid may be sprayed between the dies when they are revolved.

The shaping dies 24 are preferably made detachable from the carrier 25, being set in suitable sockets which locate the dies in proper central relation to their respective molds. This arrangement enables the dies to be easily changed and replaced by other dies of the same or of different capacities.

This arrangement is well adapted for a type of machine in which the mold table 23 rotates intermittently, either stopping or travelling more slowly at the position illustrated in the figures, so as to give time for feeding the charges of glass through the die to the mold while they are stationary, or while their paths of revolution conform closely enough to insure proper delivery.

Figure 5:
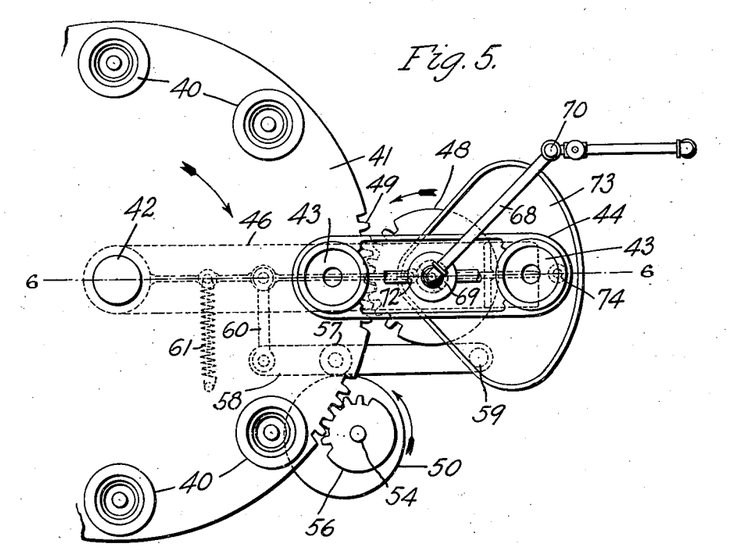
Figure 6:
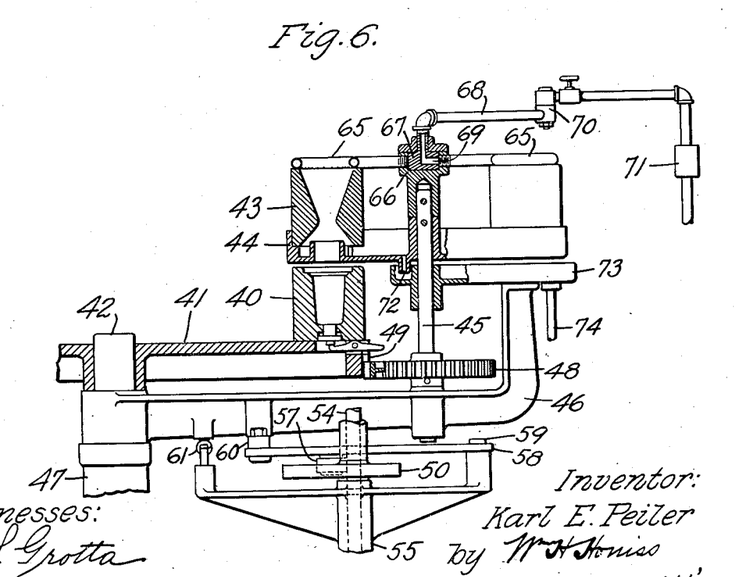

In Figs. 5 and 6 this invention is shown as applied in a different way to a different type of machine, provision being made for causing the shaping dies to travel in exact register with the shaping molds while delivering the respective blanks thereto.

In this embodiment, the shaping molds 40 are carried on a mold table 41, which may rotate either intermittently or constantly on or with the shaft 42, while the shaping dies 43, similar to those shown in the previous figures are mounted on a carrier 44 rotated by the shaft 45, supported by the arm 46, which is mounted for oscillation on the shaft or column 47 concentric with the rotation of the mold table. The carrier shaft 45 is driven by means of a gear 48 meshing with a gear 49, which turns with the table 41, the gearing being so proportioned as to bring the dies 43 successively into register with the shaping molds 40 carried by the table. To maintain the dies in registering position, the arm 46 is advanced with the table for a suitable period, while delivering the blanks from the dies to the molds. The oscillating movement of the carrier arm 46 is imparted by a cam 50 carried by the shaft 54 supported in a fixed bracket 55 and driven by the gear 56 meshing with the gear 49 of the mold table. The cam 50 bears against the pin or roller 57 of an arm 58 pivoted at 59 to a fixed portion of the framing, the other end of the arm being connected by means of a connecting rod 60 with the swinging arm 46. The contour of the cam 50 and the gearing driving that cam are so arranged and proportioned as to oscillate the arm once for each of the passing molds carried by the table. The cam 50 may have an enclosed path, or, as herein shown, it may be an open cam in which case the roller 57 is made to follow the contour of the cam by the spring 61 attached from the arm 46 to the bracket 55, or to any other convenient fixed support or attachment. The peripheral contour of the cam 50 is laid out so as to move the successive dies 43 in register with the molds, which they respectively serve, the arm 46 swinging in unison with the table during that period, during which time the gear 48 and carrier 44 obviously do not turn on their own axes. On the backward or return stroke of the arm 46 the gear 48, being in mesh with the table gear 49, rotates the die carrier 44 rapidly and brings the next die into register with the succeeding mold of the table. The charge of glass is fed to the die while the latter is thus travelling in register and in vertical alignment with the mold, in the position shown in section in Fig. 6, so that the glass blank will drop directly from the die into the shaping mold.

The water may be sprayed or otherwise delivered to the dies while they are in their outward position by a spray of water or other suitable liquid from a spraying nozzle which may operate constantly or intermittently, as may be desired. Preferably, however, the supply of liquid is conveyed through pipes 65 similar to the pipe 12 of Figs. 1 and 2. To enable the flow of liquid to reach the dies at any or all portions of their revolving movement, the pipes 65 are connected to a centrally disposed distributing head 66 here shown to be carried by the shaft 45. A valve 67 mounted in the head and supplied with liquid through the pipe 68 is provided with an outlet port 69, which may extend circumferentially of the valve to any desired amount, so as to supply the liquid to each of the dies through any portion or all of their revolving path, as illustrated in Figs. 5 and 6. The valve outlet port 69 is herein shown to be closed to stop the supply of liquid when the die is in register over its mold and delivering glass thereto. The valve 67 is secured to the supply pipe 68, so that the valve does not turn with the head 66. To enable the supply pipe to follow the oscillating movements of the arm 46 and the die carrier 44, the feed pipe is jointed at 70 and 71 in any suitable way. The pan-like die carrier 44 collects the surplus water from the dies and conducts it through the drip outlet 72 into the catch basin 73 mounted on the arm 46, and thence conveys the water away through an outlet pipe 74.

In the adaptation of this invention shown in Figs. 7 to 10 inclusive, the shaping dies 78 are carried with the rotating mold table 79, being mounted on swinging carriers 80 pivotally mounted on shafts 81 carried by the table, there being one of these dies for each of the shaping molds carried by the table. The lower ends of the shafts 81 are provided with cam arms 82 bearing against the peripheral edge 84 of a fixed cam 83, which is supported by the column or framing of the machine in any convenient way. The pins or rolls 85 of the cam arms are caused to follow the contour of the cam by means of springs 86 attached between the cam arms and suitable pins 87 under the table.

Figure 7:
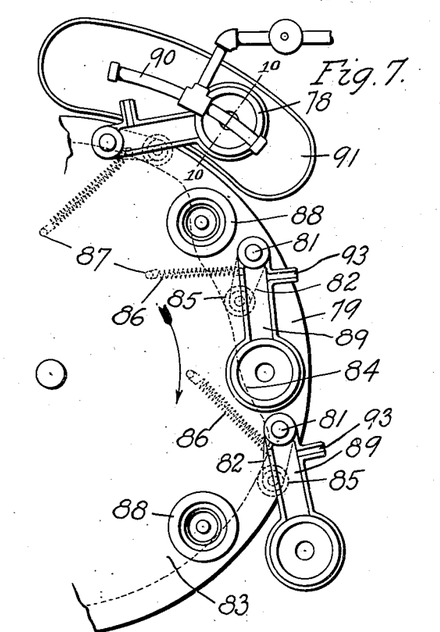
Figure 8:
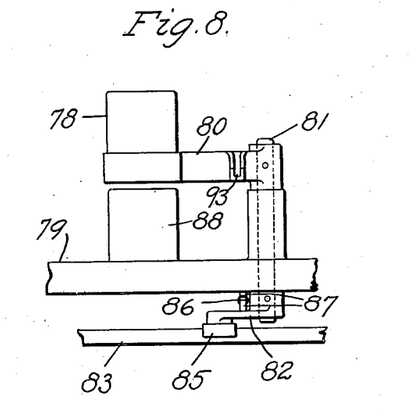
Figs. 8, 9 and 10 are elevations showing still another application of the invention, Fig. 10 being shown partly in section taken at the line 10—10 of Fig. 7.
Figure 10:
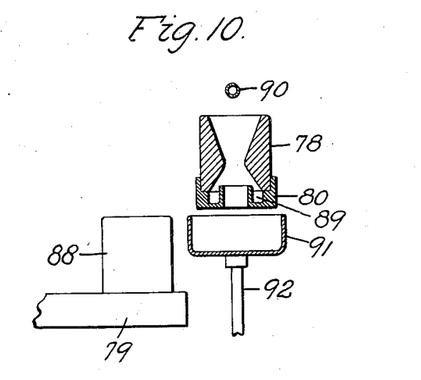

The dies 78 are sprayed while passing beneath the fixed extended spraying pipe 90, being swung by the cam 83 to their outer positions for this purpose, as shown in Figs. 7 and 10, while passing beneath the spray pipe 90. A suitable fixed trough or drip pan 91 extends beneath the spraying pipe 90, and the pathway of the dies while being sprayed, so as to collect the surplus liquid and conduct it away through the waste pipe 92. The carriers 80 are channeled at 89, or provided with rims to conduct the water from the bases of the dies, out of the spouts 93, which deliver the drip beyond the edge of the table. Ordinarily there will be very little of this drip from the spouts 93, since most of the excess liquid will be caught by the pan 91. If necessary, however, a circular gutter or trough may be arranged below the path of these spouts 93 to catch and conduct away whatever liquid may drip from them.

Figure 9:
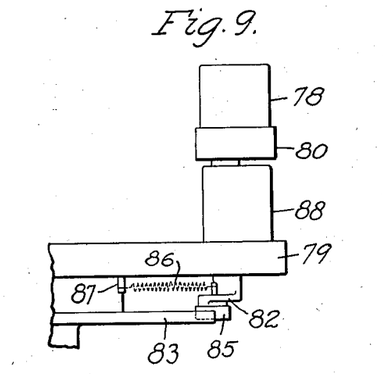

After being sprayed or otherwise supplied with its lubricating fluid, the die is swung back to its inward position over its mold 88 as shown in Fig. 9, and shown by the position of the middle carrier shown in Fig. 7, whereupon the charge of glass is delivered through the die to the mold, as described in connection with the preceding figures. The die may then be swung outwardly again as shown at the lower portion of Fig. 7 to allow plungers or other shaping instrumentalities to operate upon the glass in the mold.

An important advantage of the present invention is that it enables charges or gathers of glass to be fed in any shape which they may chance to take, from a gathering punty or from a spout or orifice, directly through the shaping dies to the center of a mold, uniformly in the form most desired for subsequent operations, without the necessity for a special shaping operation, and without appreciably chilling or delaying the charges in transit from the melting furnace to the final shaping molds.

Moreover, this method of feeding the charges of glass enables them to be delivered vertically and centrally into the shaping mold, without adhering to or swaying against the side walls of the mold during their delivering movement, as is liable to be the case with the ordinary methods of feeding similar charges of glass from an ordinary feeding spout or orifice, from which the glass, because of its viscous properties, tends to exude more or less irregularly on its different sides, thereby swaying or sagging the charge of glass toward and against the side of the mold. The film coated surface of these shaping dies reduces the friction to a minimum, and makes the friction equal on all sides, so that the charge of glass settles smoothly down through the die and emerges into the shaping mold below in a smooth, uniform column, with a minimum swaying or other irregular movement. The importance of this feature increases with the depth and narrowness of the mold cavities to which the charges are delivered.

In various ways which will occur to those familiar with this art, the invention may be modified and adapted to various purposes and conditions within the scope of the appended claims.

No claim is included herein specific to the form of the invention that is illustrated in Figs. 7 to 10 inclusive of the drawings, as such subject-matter has been reserved for, and is claimed in, my divisional application Serial No. 142,723, filed October 19, 1926.

I claim as my invention:—

1. The method of elongating and transversely contracting charges of molten glass by gravity, which consists in flowing the glass downwardly between converging surfaces moistened with a liquid film and delivering the charges therefrom in plastic condition.

2. A method of elongating charges of molten glass, which consists in flowing the charges by gravity downwardly between stationary surfaces provided with a fluid film and converging on all sides to a contracted neck and delivering the charges therefrom in plastic condition.

3. The method of feeding molten glass in separated mold charges of definite cross-section, which consists in passing the successive charges between moistened shaping surfaces converging on all sides to form the opening of the desired cross-section and delivering the charges thus formed in a plastic condition to shaping molds.

4. The method of elongating and transversely contracting charges of molten glass, which consists in flowing the glass by gravity between surfaces having an hour-glass contour provided with a fluid film.

5. The method of shaping parison blanks from molten glass, which consists in flowing the glass by gravity between stationary surfaces protected with a fluid film and converging on all sides to a contracted neck of the cross-section desired for the parison blanks.

6. A glass-shaping die having a flaring inlet and flaring outlet meeting in a contracted neck passage provided with a fluid film lining.

7. A glass-shaping die having a flaring inlet leading to a contracted neck for receiving and transversely contracting a charge of glass and having a flaring outlet below the contracted neck to clear the sides of the contracted charge and means for supplying a fluid lining film to the die.

8. A die for attenuating and elongating a charge of glass having a flaring inlet for receiving the glass and contracting its transverse dimensions, and having a flaring outlet below its contracted portion to clear the sides of the contracted charge and means for supplying a fluid lining film to the die.

9. A glass-shaping die having an inner contour approximately that of an hour-glass, and means for lining the interior contour with a fluid film.

10. A glass-drawing die having a flaring inlet for receiving charges of glass merging into a contracted portion for reducing the transverse dimensions of the glass and merging thence into a flaring outlet diverging from the sides of the contracted charge of glass, and means for lining the said contracted portion of the die with a fluid film.

11. A glass-drawing die having a flaring inlet converging to a contracted neck for receiving a charge of glass and reducing its transverse dimensions, and having also a flaring outlet below the contracted neck, a delivery orifice situated below the contracted neck of the die to receive the glass therefrom, the orifice being surrounded by an annular wall projecting into the flaring outlet of the die, and means for flowing a protecting fluid film over the contracted neck of the die.

12. A glass-shaping die, the interior surface of which below its shaping portion diverges away from the surface of the shaped glass, means for flowing a film of liquid along the wall of the die, and means at the base of the die for collecting and conducting away excess of liquid that may flow through the die.

13. A glass-shaping die provided with a contracted portion for shaping the glass, having a flaring outlet below the shaping portion, means for flowing a liquid coating along the wall of the die, and an annular channel at the base of the die for collecting excess liquid that may flow through the die.

14. A glass-drawing die having a flaring inlet converging to a contracted neck for receiving a charge of glass and reducing its transverse dimensions, and having also a flaring outlet below the contracted neck, means for flowing a liquid film downwardly over the interior surface of the shaping die, and an annular channel at the base of the die for collecting the surplus liquid.

15. The combination, with a glass shaping mold, of a hopper disposed over the mold for guiding charges of glass into the mold, the internal guiding surface of the hopper being provided with a fluid film.

16. The combination, with a plurality of traveling glass shaping molds, of a hopper for guiding separate charges of glass into the molds, and means for moving the hopper back and forth in the general direction of mold travel and registering it successively with a plurality of the said molds while guiding the charges of glass thereto.

17. The combination, with a plurality of glass shaping molds, of a hopper for guiding separate charges of glass into the molds, means for advancing the molds, and means for supporting and moving the hopper over and with the respective molds while delivering the charges thereto.

18. The combination of a set of traveling molds for shaping glass, of a hopper for guiding separated charges of glass into the said molds, and means for supporting and moving the said hopper with a reciprocating movement substantially in a horizontal plane above the molds including a movement in delivering conformity with the traveling molds while guiding the charges thereto.

19. The combination, with a traveling glass shaping mold, of a hopper for guiding a separate charge of glass into the mold, means for supporting the hopper over the mold and moving it in substantial conformity with the travel of the mold while guiding the charge thereto and means for moving said hopper laterally away from the mold.

20. A glass-drawing die having a funnel shaped inlet narrowing to a contracted portion for receiving charges of glass, and contracting its lateral thickness, and means for supplying a liquid film to the surface of the inlet, the walls of the die below its contracted portion being flared outwardly to clear the side of the glass.

21. In glass-shaping apparatus, the combination of a shaping mold, a travelling shaping die disposed above the mold and having an internal shaping contour approximating that of an hour-glass, the contracted portion of which is smaller than the mouth of the mold below, whereby the glass in delivering to the mold is reduced by the die to a cross-sectional size smaller than that of the mouth of the mold and means for conforming the travel of the die to the mold position while delivering thereto.

22. In glass-shaping apparatus, the combination with a shaping mold, of a shaping die disposed above the mold and having an internal shaping contour approximating that of an hour-glass, and means for supplying a fluid film to the shaping surface of the die.

23. In glass-shaping apparatus, the combination of a shaping mold, a shaping die disposed above the mold and having an internal shaping contour approximating that of a conventional hour-glass, and means for flowing a liquid film downwardly over the shaping surface of the die, the flow converging toward the contracted portion of the die and diverging below the contracted portion.

24. In glass-shaping apparatus, the combination with a shaping mold, of a shaping die having an internal shaping contour approximating that of a conventional hour-glass, means for flowing a liquid film downwardly along the converging shaping surfaces of the die and outwardly below the contracted portion of said surface, and means for collecting and conveying away the liquid issuing from the die.

25. In glass-shaping apparatus, the combination with a shaping mold, of a shaping die having an internal shaping contour approximating that of a conventional hour-glass, means for flowing a film of liquid downwardly over the shaping surface of the die, and outwardly at its flaring bottom portion, means for registering the shaping die above the mold for the delivery of glass thereto, and means intercepting the flow of liquid from the bottom of the die while allowing the glass to pass from the die to the mold.

26. In a glass working machine, a plurality of traveling shaping molds, a hopper for guiding separated charges of glass to the molds, means for supporting the hopper above the level of the molds, and moving it with successive molds while delivering charges thereto.

27. In glass-shaping apparatus, the combination of a traveling shaping mold, a traveling shaping die, means for conforming the paths of travel of the die and mold to register them together during some portion of their travel, and means for supplying the shaping surface of the die with a film of fluid while travelling.

28. In glass-shaping apparatus, the combination with a traveling shaping mold, of a traveling shaping die having an interior shaping contour approximating that of a conventional hour-glass, means for flowing a film of liquid downwardly over the interior shaping surface of the die, means for periodically disposing the shaping die over the mold to deliver the glass thereto, and means for diverting the excess liquid passing through the die, to prevent it from entering the mold with the glass.

29. In glass-shaping apparatus, the combination with a revolving shaping mold, of a revolving shaping die having an internal shaping contour approximating that of a conventional hour-glass, means for flowing a film of liquid downwardly along the shaping surface of the die, means for periodically disposing the shaping die above the mold to direct shaped charges of glass thereto, and means for diverting the liquid that flows from the die to prevent it from entering the mold with the glass.

30. In glass-shaping apparatus, the combination with a revolving shaping mold, of a revolving shaping die, having an internal shaping contour approximating that of a conventional hour-glass, means for periodically conforming the paths of revolution of the mold and die to register the mold and the die together with the die above the mold for delivering glass thereto, means for coating the shaping surface of the die with a liquid film, and means for preventing the liquid from flowing from the die into the mold with the glass.

31. In glass-shaping apparatus, the combination of a revolving mold, a revolving die, mechanism for revolving the mold and the die in paths coinciding at some portions and diverging at other portions, means for flowing a liquid film over the surface of the die, and means for delivering molten glass through the die to the mold while revolving through a coinciding portion of their path.

32. In glass-shaping apparatus, the combination of a plurality of shaping molds, a plurality of shaping dies, mechanism for carrying the molds and the dies in paths conforming at some portion to register the dies over their respective molds, means for delivering the charges of glass into and through the dies to the molds while thus in register, means for coating the shaping surfaces of the dies with a liquid film, and means for intercepting any outflowing portion of the liquid film at the bottom of the die, and conducting it away from the mold.

33. In a glass-shaping machine, the combination of a shaping mold, a revolving shaping die delivering shaped charges of glass to the mold, a revolving carrier for supporting the shaping die, and means for coating the shaping surface of the die with a liquid film, the carrier being provided with means for collecting and conducting away any excess liquid flowing through and from the die.

34. In a glass-shaping machine, the combination of shaping molds, revolving shaping dies delivering shaped charges of glass to the molds, a revolving carrier for supporting the shaping dies, and means for coating the shaping surfaces of each die with a liquid film, the carrier being provided with means for collecting and conducting away any excess liquid passing through and from the dies.

35. In a glass-shaping machine, the combination of shaping molds, revolving shaping dies delivering shaped charges of glass to the molds, a revolving carrier for supporting the shaping dies, and means for coating the shaping surfaces of the dies with a liquid film, the carrier being provided with means including a revolving discharge spout for collecting and conducting away the excess liquid passing through the dies, and a conduit below the discharge spout for receiving and conducting away the drip from the said spout.

36. In a glass machine, a plurality of molds movable in a closed path, a transferring or distributing receptacle for delivering separated charges of glass to the molds, and means for moving said distributing receptacle with a moving mold while delivering glass thereto and then returning the receptacle into similar delivering relation to a succeeding mold.

37. In a glass machine, a plurality of molds movable in a closed path, a transferring or distributing receptacle for delivering separated charges of glass to said molds, means for moving the distributing receptacle with one of the moving molds while delivering glass thereto, and for returning the distributing receptacle to an initial position and similarly moving it in delivering relation to a succeeding moving mold.

38. In a glass machine, a plurality of molds, moving continuously in a closed path, a transferring or distributing hopper adapted to receive a separated charge of molten glass and to deliver it vertically into a mold, said hopper being mounted for reciprocation above the said path, means for moving the hopper in axial delivering relation to one of the moving molds, maintaining this relation while transferring the entire charge of glass thereto, returning the hopper to an initial position, and moving it in similar delivering relation to a succeeding moving mold.

39. In a glass machine, a rotatable table, a plurality of receiving receptacles mounted thereon, a transferring or distributing hopper mounted for movement in an arc concentric with the axis of movement of the table, and in alignment with said receiving receptacles, means for causing a coincident moving of the distributing hopper with a receiving receptacle while delivering a separated charge of glass thereto, and after traveling a predetermined distance returning the distributing hopper to its initial position.

40. In a glass machine, a supporting column, a table rotatable thereon, a plurality of molds mounted upon the table, an arm operatively supported upon the column for movement therearound, a transferring or distributing hopper mounted upon said arm, and adapted to coact with said molds, means for moving the arm to cause the distributing hopper to follow a mold moving with the table while delivering a separated charge of glass thereto, and for returning the arm to an initial position for similarly following the movement of a succeeding mold.

41. In mechanism for making articles of glass, a continuously movable mold carrier, a plurality of molds mounted thereon, a receptacle in position to receive a separated charge of molten glass from a furnace and to deliver it vertically to one of the molds, mechanism connected with the receptacle and adapted to maintain the receptacle successively in vertical alinement with the respective molds during the complete discharge of the glass therein.

42. In mechanism for making articles of glass, a continuously movable mold carrier, a plurality of molds mounted thereon, a receptacle having a pivotal mounting and being adapted for the reception of a separated charge of molten glass from a furnace, and for vertical delivery of the entire charge to a mold, and mechanism connected with the receptacle for moving the receptacle independently of its pivotal mounting to carry the receptacle in vertical alinement with successive molds.

43. In mechanism for making articles of glass, a receptacle positioned and adapted to receive a separated charge of molten glass from a furnace and to deliver the entire charge vertically to a mold, the said receptacle having a pivotally movable support and being also movable horizontally in a plane at an angle to the axis of its support, and a plurality of continuously moving molds passing under one end of the receptacle and receiving the glass therefrom in succession.

44. In a glass machine, a supporting column, a table rotatable thereon, a plurality of molds mounted upon the table, an arm operatively supported upon the column for movement therearound, a transferring or distributing receptacle mounted upon said arm and adapted to coact with said molds, means for moving the arm immediately after a mold has arrived beneath the distributing receptacle to thereby cause the distributing receptacle to follow with the mold, and after the distributing receptacle has traveled with the mold for a predetermined distance to return the said arm to its initial position.

45. The method of feeding mold charges of molten glass to a plurality of shaping molds traveling continuously in a closed path, which comprises successively moving the molds past a feeding station, dropping a mold charge downwardly toward each mold as it passes the feeding station, imparting a horizontal lateral component of motion to the downwardly moving charge and guiding it centrally downward into the moving mold.

46. The combination with a series of molds moving continuously in a closed path, of a series of guides moving continuously in a different path from that of the molds and brought successively into position above and in register with the successive molds, said guides being shaped to direct into the molds, charges of molten glass dropped from a position over said guides while the latter are in register with the molds.

47. The combination with a glass forming machine comprising a series of molds rotating continuously in a closed path, of a series of funnels moving continuously in a different closed path and brought successively over and in register with the successive molds.

48. The combination of a series of molds moving continuously in a closed path, and a series of guides through which charges of glass are delivered by gravity into the molds, said guides moving continuously in a different closed path from that of the molds and brought successively into register with the molds, each guide moving at the same speed and in the same direction with its mold for a substantial distance while in register therewith.

49. The combination of a series of molds moving in a closed path, a series of guides moving in a different path, a charging station to which the molds are brought, and means to supply charges of glass at said station through the guides to the molds, said guides being brought successively into register with the molds while at the charging station.

50. Apparatus for use with means for forming gobs of molten glass, comprising a continuously rotating mold table, molds thereon brought successively to charging position beneath the gob forming means, guides moving in a path eccentric to and overlapping that of the molds, and means to impart a movement to the guides while within range of the molds to thereby cause the guides to register with the molds during an extended portion of their movement, said guides while in register with the molds being beneath said gob forming means in position to direct the gobs into the molds.

51. The combination with a mold carriage rotatable continuously about a vertical axis, of an annular series of molds carried thereon, an annular series of funnel shaped guides, a carrier for the guides, and gearing to rotate said carrier about a vertical axis in synchronism with the rotation of the mold carriage, said guides traveling in a plane above the molds and arranged to be brought serially above and into register with the respective molds.

52. The combination with a charging station, of a mold carriage rotatable continuously about a vertical axis, an annular series of molds carried thereon and brought successively to the charging station, an annular series of funnel shaped guides, a carrier for the guides, means to rotate the carrier about a vertical axis in synchronism with the rotation of the mold carriage, said guides traveling in a plane above the molds and arranged to be brought serially above and into register with the respective molds as the latter pass the charging station, the guides being arranged to receive charges of glass and direct them into the molds at said station.

53. The combination with a continuously rotating mold table having molds thereon, each adapted for the further shaping therein of a preliminarily shaped quota of glass, of a carrier arranged to rotate about an axis different from that of said mold table, devices on said carrier for aiding in imparting a preliminary shape to the quotas of glass and for transferring said quotas of glass to the molds, and means for causing each of said preliminary shaping devices to travel with a mold for a substantial distance for imparting a horizontal lateral component of motion to the preliminarily shaped quota and delivering it centrally into the moving mold.

In testimony whereof I have signed my name to this specification this 16th day of March, 1914.

KARL E. PEILER.

CERTIFICATE OF CORRECTION.

Patent No. 1,756,493.　　　　　　　　　　　Granted April 29, 1930, to

KARL E. PEILER.

It is hereby certified that error appears in the printed specification of the above numbered patent requiring correction as follows: Page 4, line 95, claim 1, strike out the words "by gravity" and insert the same to follow after the word "glass" in line 96; page 5, line 75, claim 17, and line 91, claim 19, for the word "separate" read "separated"; and that the said Letters Patent should be read with these corrections therein that the same may conform to the record of the case in the Patent Office.

Signed and sealed this 24th day of June, A. D. 1930.

(Seal)

M. J. Moore,
Acting Commissioner of Patents.